(12) United States Patent
Wong

(10) Patent No.: US 9,371,949 B2
(45) Date of Patent: *Jun. 21, 2016

(54) LOCKING MECHANISM FOR UNISEX BALL VALVE COUPLING

(71) Applicant: RAYCON INDUSTRIES, INC., Brea, CA (US)

(72) Inventor: Tak-Yiu Wong, Long Beach, CA (US)

(73) Assignee: Raycon Industries, Inc., Brea, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/466,851

(22) Filed: Aug. 22, 2014

(65) Prior Publication Data

US 2015/0097131 A1    Apr. 9, 2015

Related U.S. Application Data

(63) Continuation of application No. 13/177,466, filed on Jul. 6, 2011, now Pat. No. 8,814,137.

(60) Provisional application No. 61/362,033, filed on Jul. 7, 2010.

(51) Int. Cl.
| | |
|---|---|
| F16L 37/38 | (2006.01) |
| F16K 35/10 | (2006.01) |
| F16L 37/18 | (2006.01) |
| F16L 37/252 | (2006.01) |
| F16L 37/44 | (2006.01) |
| F16L 37/47 | (2006.01) |
| F16K 5/06 | (2006.01) |

(52) U.S. Cl.
CPC . *F16L 37/18* (2013.01); *F16K 5/06* (2013.01); *F16L 37/252* (2013.01); *F16L 37/38* (2013.01); *F16L 37/44* (2013.01); *F16L 37/47* (2013.01); *F16K 35/10* (2013.01)

(58) Field of Classification Search
USPC ............ 251/89, 89.5, 111, 149.5, 149.9, 148; 137/614.06
See application file for complete search history.

(56) References Cited

U.S. PATENT DOCUMENTS

| | | | |
|---|---|---|---|
| 1,428,933 A | 9/1922 | Bean, Jr. | |
| 4,438,779 A | 3/1984 | Allread | |
| 5,332,001 A | 7/1994 | Brown | |
| 5,505,428 A | 4/1996 | Moss et al. | |
| 8,814,137 B2 * | 8/2014 | Wong | 251/149.9 |

* cited by examiner

*Primary Examiner* — Mary McManmon
*Assistant Examiner* — Jonathan Waddy
(74) *Attorney, Agent, or Firm* — Knobbe, Martens, Olson & Bear, LLP

(57) ABSTRACT

A hydraulic valve coupling has an interlock mechanism that includes at least one blocking member within an interlock passage of a body of the valve coupling. The interlock passage has a first end opening to the valve shaft and a second end opening to an interface groove of the valve coupling. The at least one blocking member can be retracted within the interlock passage such that the valve coupling can be rotated and disengaged from a mating coupling. When the valve is in the open position, the at least one blocking member is positioned within the interlock passage such that it contacts the mating coupling and prevents rotation of the valve coupling relative to the mating coupling. The second end of the at least one blocking member can be shaped such that it is retracted as a result of contact with the mating coupling without assistance from a biasing mechanism.

16 Claims, 3 Drawing Sheets

LOCKING MECHANISM FOR UNISEX BALL VALVE COUPLING

RELATED APPLICATIONS

Related applications are listed in the Application Data Sheet (ADS) accompanying this application. The entirety of each related application listed on the ADS is expressly incorporated by reference herein.

BACKGROUND OF THE INVENTION

1. Field of the Invention

The present invention generally relates to unisex ball valve couplings. In particular, the present invention relates to a unisex ball valve coupling having an improved interlocking mechanism.

2. Description of the Related Art

A unisex ball valve coupling is a quick disconnect coupling, in which two identical coupling halves can be connected to one another, normally by relative rotation therebetween. The ball valve unisex couplings currently available utilize a manually operated ball valve which is opened or closed by turning a handle. When two identical halves are connected, an interface seal is engaged between them. When the ball valve is open, a flow path is established through the coupling assembly and a locking mechanism, or interlocking mechanism, is actuated such that the two connected coupling halves cannot be disconnected while the valve is in an open position.

The unisex couplings of the known existing art typically use one of two interlocking mechanisms to avoid inadvertent disconnection of the coupling halves. The first of these interlocking mechanisms uses a geared handle shaft to drive a geared pin into a hole at the interface of the mating coupling half when the valve handle is turned to the open position. This pin stops the two halves from being turned for disconnection. Turning the valve handle to the closed position retracts the pin and unlocks the halves from one another.

The second interlocking mechanism uses a spring-loaded locking element that is positioned on the path of the latching lugs of the mating half. When the valve is in the closed position, the valve shaft, machined in a half moon shape, allows the locking element to be compressed by the mating half and complete the connection. After the halves are fully connected, the locking element is spring loaded behind the mating latching lug. When the valve is opened, the valve shaft prevents the locking element from retracting, which prevents the mating half from disconnecting.

SUMMARY OF THE INVENTION

An object of the current invention is to provide unisex coupling halves that lock relative to one another, at least when the valve is in an open position, using a simpler and more reliable locking mechanism. As described above, a unisex coupling is a quick disconnect mechanism with two identical halves connected together by a turning action, which form a leak-tight flow path when connected that allows for the transfer of fluid through the coupling assembly. As understood by those skilled in the art, the coupling is referred to as "unisex" or "identical" because the interface portions of the two coupling halves are substantially identical (as opposed to having a male/female relationship or other non-identical arrangement). However, it is not necessary that the entirety of both coupling halves be identical. For example, one of the coupling halves may include a valve mechanism, while the other of the coupling halves may not.

Preferred embodiments may utilize a cam action ball jamming interlocking mechanism that does not require gear-drive or spring-biasing mechanisms. Some or all of the preferred embodiments are designed to be interchangeable and compatible with the design of existing art. Therefore, the new and existing designs may have the same interface latching lugs and elements for compatibility. Preferably, the inventive couplings are equipped with an interface seal and ball valve to facilitate a leak-tight flow path when connected and opened.

In at least one embodiment, the valve shaft of the coupling has a cam section machined on its outside diameter. When the valve handle is turned, the cam mechanically drives a number of balls through the coupling body such that a portion of the ball in the far end is driven into the path of the mating half latching lug, locking the mating half in the connected position. As the valve is turned to the closed position, the cam frees the balls which roll back into the valve body either by gravity or compression from the disconnecting turn motion of the mating half, thus freeing the mating half.

The preferred embodiments differ from the existing art in one respect by utilizing a cam action ball jamming mechanism that does not require a gear or spring. The cam driven balls in at least some of the preferred embodiments are driven directly or indirectly by either the valve shaft cam or by the mating coupling latching lugs. Benefits of such an arrangement include, but are not limited to: the elimination of a relatively complicated gearing mechanism, the elimination of a spring in the interlock mechanism which can become hung as a result of contamination and render the mechanism inoperable. In comparison to the known prior art, preferred embodiments of the present invention are more simple mechanically and more contamination tolerant in function.

An embodiment involves a hydraulic valve coupling that has an interlock mechanism including at least one blocking member located within an interlock passage of a body portion of the valve coupling. The interlock passage has a first end opening to the valve shaft and a second end opening to an interface groove of the valve coupling. The at least one blocking member can be retracted within the interlock passage such that the valve coupling can be rotated and disengaged from a mating coupling. When the valve is in the open position, the at least one blocking member is positioned within the interlock passage such that it contacts the mating coupling and prevents rotation of the valve coupling relative to the mating coupling. The second end of the at least one blocking member can be shaped such that it is retracted as a result of contact with the mating coupling and without the assistance of a biasing mechanism.

An embodiment involves a hydraulic coupling half assembly including a body portion defining an internal passage configured to permit hydraulic fluid to pass through the body portion. The body portion has an interface end that is configured to engage an interface end of a mating coupling half assembly. The interface end includes a circumferential groove configured to receive a portion of the interface end of the mating coupling half. A valve within the body portion has a valve body, which has an open position in which fluid flow is permitted through the internal passage and a closed position in which the valve body closes off fluid flow through the internal passage. The valve also includes a valve shaft that engages the valve body and rotates with the valve body between the open position and the closed position. A handle is coupled to the valve shaft, which rotates along with rotation of the handle such that the handle can be used to move the valve body between the open position and the closed position.

An interlock mechanism includes a plurality of balls located within an interlock passage of the body portion, wherein the interlock passage has a first end opening to the valve shaft and a second end opening to the groove. A first end ball of the plurality of balls is positioned at the first end of the interlock passage and contacts a cam surface of the valve shaft and a second end ball of the plurality of balls is positioned at the second end of the interlock passage. When the valve is in the closed position, the cam surface permits the plurality of balls to be retracted within the interlock passage such that the second end ball is sufficiently retracted from the groove to permit the coupling half to be rotated and disengaged from the mating coupling half. When the valve is in the open position, the cam surface positions the plurality of balls within the interlock passage such that a portion of the second end ball is positioned within the groove a sufficient distance to contact the mating coupling half and prevent rotation of the coupling half relative to the mating coupling half Another embodiment involves a hydraulic coupling half assembly including a body portion defining an internal passage configured to permit hydraulic fluid to pass through the body portion. The body portion has an interface end that is configured to engage an interface end of a mating coupling half assembly. The interface end includes a circumferential groove configured to receive a portion of the interface end of the mating coupling half. A valve within the body portion includes a valve body, which has an open position in which fluid flow is permitted through the internal passage and a closed position in which the valve body closes off fluid flow through the internal passage. The valve also includes a valve shaft that engages the valve body and rotates with the valve body between the open position and the closed position. An interlock mechanism includes at least one blocking member located within an interlock passage of the body portion. The interlock passage has a first end opening to the valve shaft and a second end opening to the groove. A first end of the at least one blocking member is positioned at the first end of the interlock passage and contacts a cam surface of the valve shaft and a second end of the at least one blocking member is positioned at the second end of the interlock passage. When the valve is in the closed position, the cam surface permits the at least one blocking member to be retracted within the interlock passage such that the second end of the at least one blocking member is sufficiently retracted from the groove to permit the coupling half to be rotated and disengaged from the mating coupling half. When the valve is in the open position, the cam surface positions the at least one blocking member within the interlock passage such that a portion of the second end of the at least one blocking member is positioned within the groove a sufficient distance to contact the mating coupling half and prevent rotation of the coupling half relative to the mating coupling half. The second end of the at least one blocking member is shaped such that the at least one blocking member is retracted within the interlock passage as a result of contact with a portion of the mating coupling half during rotation of the coupling half relative to the mating coupling half without the assistance of a biasing force applied to the at least one blocking member.

BRIEF DESCRIPTION OF THE DRAWINGS

These and other features, aspects and advantages of the present invention are described herein with reference to drawings of preferred embodiments, which are intended to illustrate, and not to limit, the present invention. The drawings contain five (5) figures.

DETAILED DESCRIPTION OF THE PREFERRED EMBODIMENTS

Figure 1:
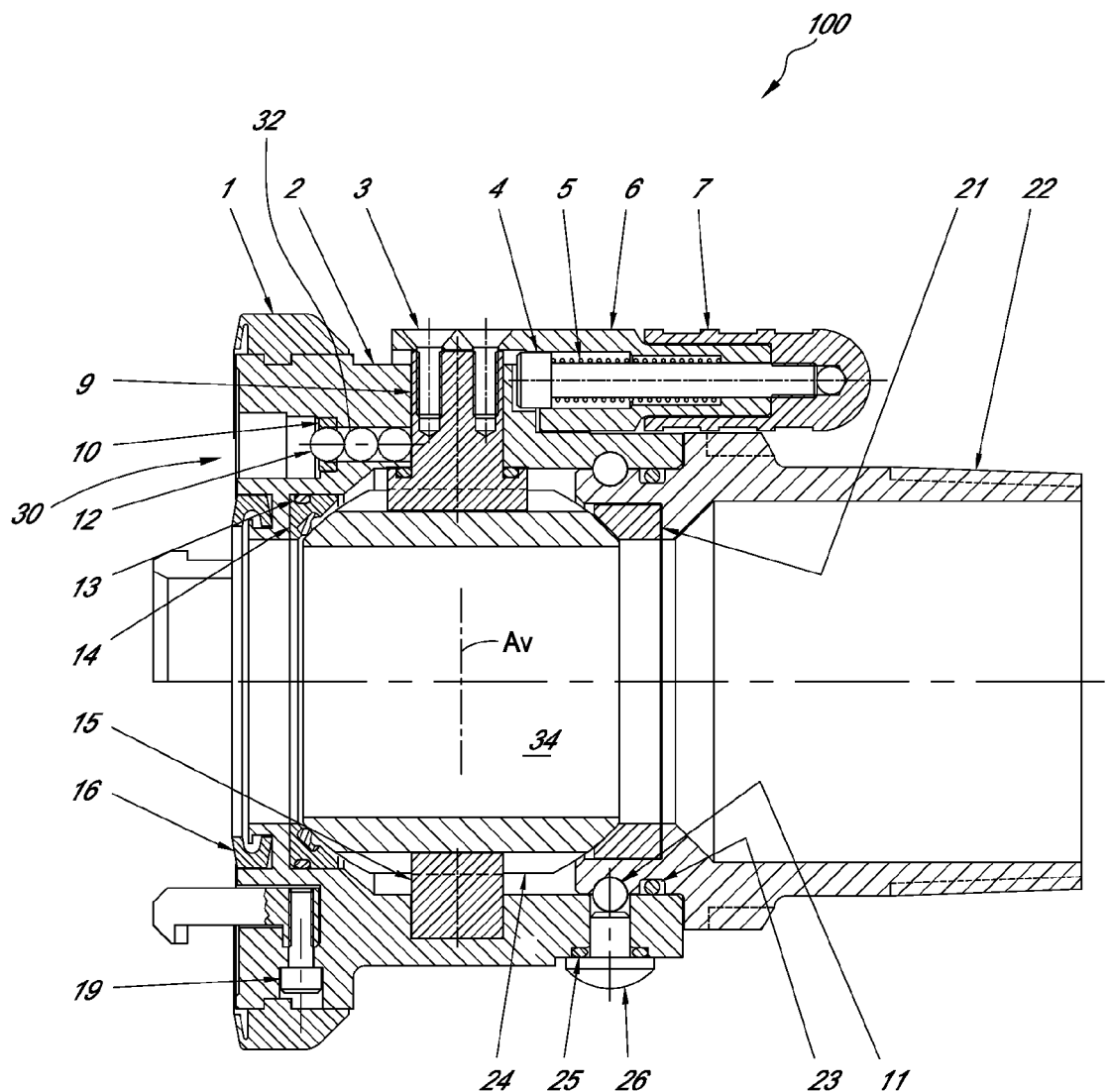
FIG. 1 is a cross-sectional view of a coupling half that includes a ball valve taken along a longitudinal axis of the coupling half, with the ball valve in the open position.
Figure 2:
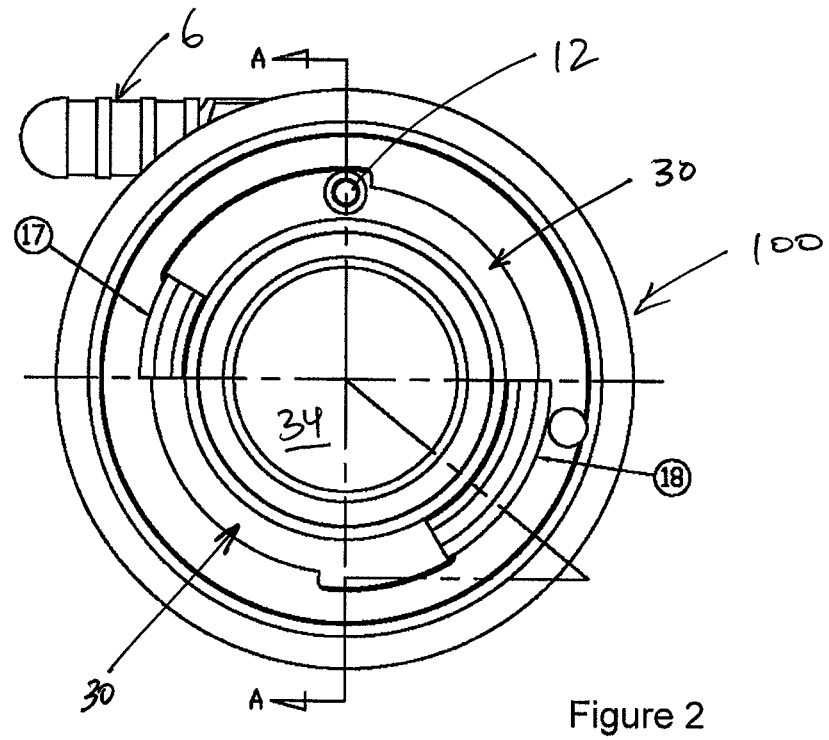
FIG. 2. is an end view of the assembled coupling half, with the ball valve in the closed position.
Figure 3:
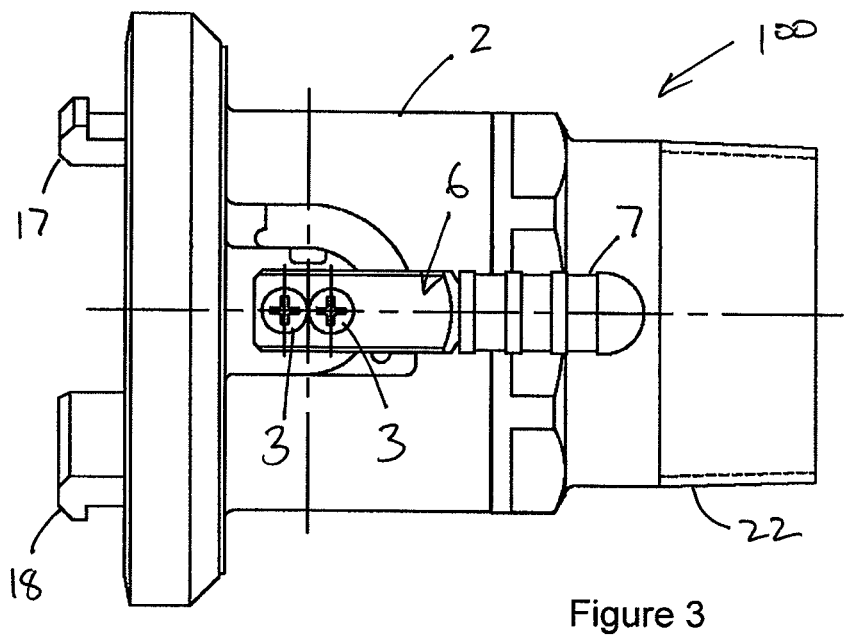
FIG. 3 is a top view of the assembled coupling half, with the ball valve in the open position.
Figure 4:
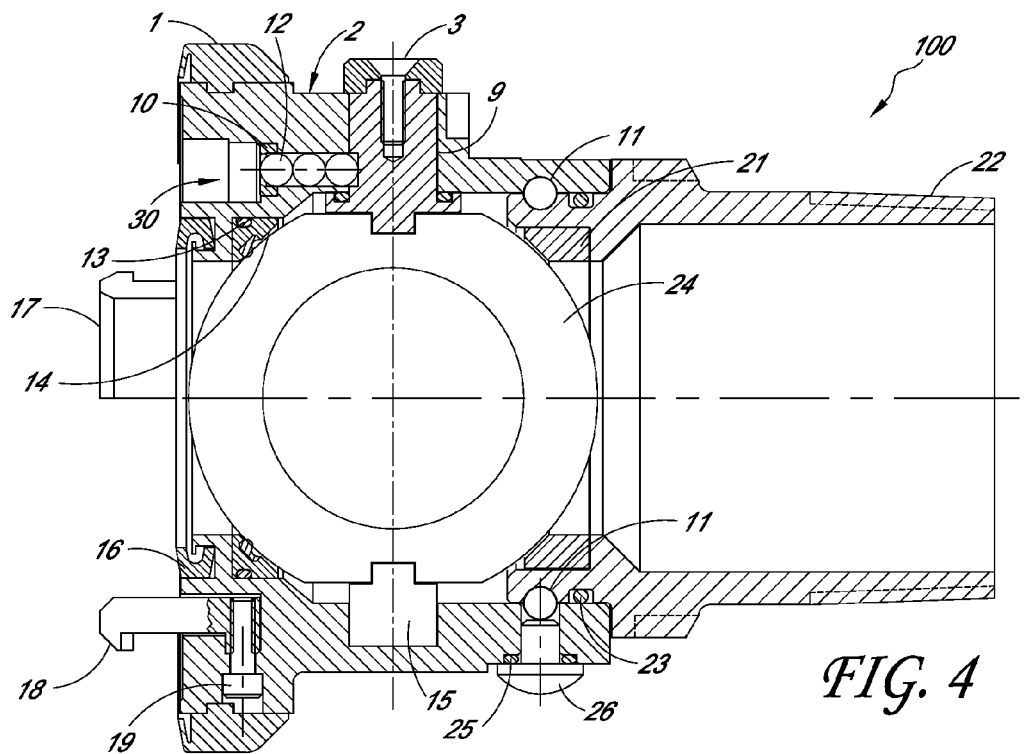
FIG. 4 is a cross-section view of the assembled coupling half taken along a longitudinal axis, with the ball valve in the closed position.
Figure 5:
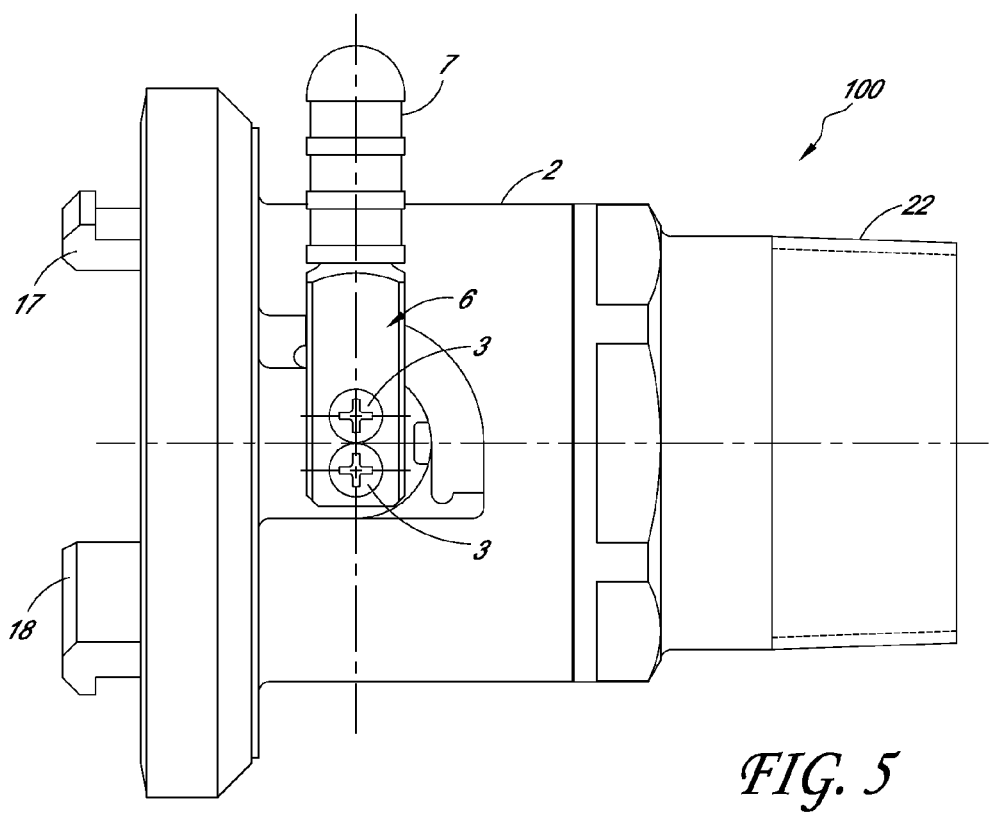
FIG. 5 is a top view of the assembled coupling half, with the ball valve in the closed position.

FIGS. 1-5 illustrate one half of a unisex coupling assembly 100 having certain features, aspects and advantages of the present invention. The coupling assembly 100 is configured to be connected to a hose, or other type of hydraulic conduit. The coupling assembly 100 can be engaged with another coupling assembly 100, or a similar non-valved assembly, to releasably connect two hydraulic lines. The coupling assembly 100 includes a valve arrangement that can permit or restrict fluid flow through the valve. The coupling assembly 100 also includes a locking mechanism, or interlocking mechanism, that prevents decoupling of the coupling assembly 100 and it's mating coupling assembly when the valve arrangement is open to prevent spillage of the hydraulic fluid passing through the hydraulic line in which the coupling assembly 100 is incorporated.

The illustrated coupling assembly 100 includes a generally or substantially cylindrical body 2 with a bumper 1 installed at its interface end for drag and drop protection. That is, the bumper 1 can be constructed of a suitable material, such as a resilient material, to inhibit damage to the coupling assembly 100 due to inadvertent contact with another object. The body 2 can be constructed of any suitable material, such as metal, by any suitable manufacturing process, such as forging, machining or casting.

The body 2 includes an engagement structure, which can be a unisex engagement structure, on an interface end thereof. The engagement structure permits the coupling assembly 100 to be coupled to another coupling assembly 100 or a non-valved coupling with a similar interface end. Preferably, the engagement structure is a unisex structure. That is, the engagement structure is the same shape on each coupling or mating half that are coupled to one another. However, the engagement structure can also be a non-unisex arrangement, if desired. Preferably, the unisex engagement structure includes a circumferential, preferably butterfly-shaped groove 30 with an undercut that is machined or otherwise formed at the interface end of the body. Preferably, two generally L-shaped latching lugs 17 and 18 are positioned relative to this groove 30 such that the latching lugs 17 and 18 can be inserted into the butterfly shape groove of the mating half. The latching lugs 17 and 18 latch to the groove of the mating half being turned for connection. There are multiple ways that the latching lugs 17 and 18 may be secured to the coupling body 2. They can be secured with use of fasteners, such as the illustrated screws 19, or machined as part of the coupling body 2. Preferably, the latching lugs 17, 18 have two different circumferential lengths. Other suitable methods for forming or attaching the lugs 17 and 18 may also be used. Also installed at the interface end of the coupling body 2 is an interface seal 16. When the coupling halves are connected, the interface seals 16 of each mating half sealingly engage one another and form a leak-tight interface between the two mating halves.

The valved version of the unisex coupling is equipped with a ball valve 24 inside the coupling body 2. The ball valve 24 has a generally spherical outer surface and turns about an axis $A_V$ defined by the rotational centers of the handle shaft 9 and guide shaft 15. When turned to the closed position, the ball valve 24 engages a seal ring 14 to stop any external leakage through the interface end of the coupling. The seal ring 14 is equipped with an O-ring seal 13 which seals between the seal ring 14 outside diameter and the coupling body 2 inside diameter to inhibit or eliminate external leakage around the seal ring 14.

The ball valve 24 is opened or closed by turning the handle 6. The illustrated handle 6 is secured to the handle shaft using fasteners such as screws 3. The handle 6 is equipped with a locking mechanism that, in the illustrated arrangement, is in the form of a fastener, such as a screw 4, attached to the handle grip 7 and biased into a locked position by a biasing member, such as spring 5. The locking mechanism locks the handle 6 and hence the ball valve 24 in either the open or closed position when so selected by an interference position between the handle assembly and the coupling body. When turned to the open or closed position, the spring 5 pushes the head portion of the screw 4 into a respective slot on the handle boss of the coupling body 2 such that the handle 6 will be locked in the selected position by interference contact between the head portion of the screw 4 and the slot of the coupling body 2 (acting as an interference member and an interference contact surface, respectively) and avoid being inadvertently turned from its selected position. Pulling back on the handle grip 7 in a direction aligned with the longitudinal axis of the handle 6 compresses the spring 5 and disengages the screw 4 head from the slot on the coupling body 2 handle boss, allowing the handle 6 and ball valve 24 to be turned from the open to the closed position and vice versa.

One desirable feature of the coupling assembly 100 is a locking or interlocking mechanism configured to prevent the two connected coupling halves from being inadvertently disconnected while the ball valve(s) 24 is placed in open position. Preferred embodiments of the present invention use a cam action ball jamming mechanism to achieve this feature, which is different from and has advantages over the geared pin or spring-loaded locking device utilized in the existing art.

The illustrated cam action ball jamming mechanism includes at least one and preferably a number of balls 12 located within an interlock passage 32 in the coupling body 2 that extends between the handle shaft 9 and the bottom surface of the butterfly shaped groove 30, preferably in a direction aligned with the internal fluid passage 34 of the coupling assembly 100. In the illustrated arrangement, three balls 12 are provided; however, a greater or lesser number of balls 12 could be provided. The balls 12 are retained in the coupling body 2 by an annular retaining disc 10 which may be interference or compression fitted (or otherwise secured) into the coupling body 2. The balls 12 engage a cam surface machined or otherwise provided on the side of the handle shaft 9. In particular, a first end one of the balls 12 contacts the cam surface of the handle shaft 9.

When the handle shaft 9 and the ball valve 24 are in the closed position, the cam surface of the handle shaft 9 allows the balls 12 to retract into the coupling body 2 opening up a free path in the butterfly shaped groove 30 to accommodate the latching lugs 17, 18 from the mating coupling. After the two coupling halves are connected, placing the handle 6 in the open position allows the cam surface of the handle shaft 9 to jam a second end one of these balls 12 into the bottom of the butterfly shaft groove 30 at the interface of the coupling body 2. When at least a portion of the end one of these balls 12 is located in the disconnection path for one of the latching lugs 17, 18 of the mating coupling, placing the ball valve 24 of either mating coupling half (if a valve is present in both halves) in an open position blocks the other coupling half from being turned for disconnection.

Although a series of balls 12 is illustrated, and is preferred for the ability to smoothly move within the passage 32 of the coupling body 2, other suitable objects, components or bodies may be provided in addition or in the alternative to the balls 12 to transfer the motion of the cam surface to a blocking member within the butterfly shaft groove 30. For example, a non-spherical member (such as a rod) could be used alone or between two end balls 12 to transfer motion from a ball 12 contacting the cam surface to the end ball 12 that moves into the butterfly shaft groove 30 and acts as a blocking member. Preferred arrangements do not require spring-biasing and avoid intricately-shaped motion transfer mechanisms, such as gears. Such arrangements are more cost-effective to manufacture and are more reliable in operation. For example, when the ball valve 24 is in the closed position, the balls 12, or other blocking member, can be moved out of the groove 30 by contact with one of the latching lugs 17, 18 of the other coupling half during relative rotation of the coupling halves. The spherical shape of the balls 12 facilitates this longitudinal movement of the balls 12 in response to rotational movement of the other coupling half. However, other shapes, such as a chamfered, ramped or angled shape, can also be used to facilitate longitudinal movement of the balls 12 or other blocking member. Accordingly, no spring or other biasing mechanism is necessary to move the balls 12 out of the groove 30.

Opposing the interface end of the coupling body 2 is the adapter end. The adapter end of the unisex coupling preferably is equipped with a ball swivel assembly such that an adapter 22 of a fitting method such as threads, flanges, hose barbs, or camlock fittings can be installed for assembly of the unisex coupling assembly 100 to its mounting equipment (such as a hose or nozzle etc.) as desired. The adapter 22 includes an O-ring seal 23 which establishes a leakage free swivel with the coupling body 2 such that the unisex coupling can be turned freely for connection to the mating unisex coupling while the mating equipment the adapter 22 is installed on might remain stationary. The balls 11 that facilitate the swivel joint between the coupling body 2 and the adapter 22 preferably are retained between these two parts with a retaining screw 26 located on the ball groove through a threaded hole in the coupling body 2. Through this threaded hole, the swivel balls 11 (for example, 39 balls) are fed into the swivel grooves of the coupling body 2 and the adapter 22 for assembly. The ball retaining screw 26 preferably is equipped with an O-ring 25 such that after it is secured onto the coupling body 2, the O-ring will inhibit or preferably prevent any external leakage around the ball retaining screw 26.

Between the ball valve 24 and the adapter 22, a thrust bushing 21 is placed to align the valve ball 24 with the handle shaft 9 and guiding shaft 15 to facilitate easy turning of the ball valve 24 into the open or closed position. The illustrated thrust bushing 21 is a separate member from the coupling body 2 and adapter 22; however, in some arrangements, the thrust bushing or structure serving as the thrust bushing 21 could be integrated or unitary with the coupling body 2 or adapter 22.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In particular, while the present interface locking mechanism for a unisex ball valve coupling has been described in the context of particularly preferred embodiments, the skilled artisan will appreciate, in view of the present disclosure, that certain advantages, features and aspects of the mechanism and overall system may be realized in a variety of other applications, many of which have been noted above. Additionally, it is contemplated that various aspects and features of the invention described can be practiced separately, combined together, or substituted for one another, and that a variety of combination and subcombinations of the features and aspects can be made and still fall within the scope of the invention. Thus, it is intended that the scope of the present invention herein disclosed should not be limited by the particular disclosed embodiments described above, but should be determined only by a fair reading of the claims.

What is claimed is:

1. A hydraulic coupling half assembly, comprising:
    a body portion defining an internal passage configured to permit hydraulic fluid to pass through the body portion, the body portion having an interface end that is configured to engage an interface end of a mating coupling half assembly;
    a valve within the body portion, the valve having a valve body, which has an open position in which fluid flow is permitted through the internal passage and a closed position in which the valve body closes off fluid flow through the internal passage, the valve further comprising a valve shaft that engages the valve body and rotates with the valve body between the open position and the closed position;
    a handle coupled to the valve shaft, wherein the valve shaft rotates along with rotation of the handle such that the handle can be used to move the valve body between the open position and the closed position;
    an interlock mechanism comprising a plurality of blocking members located within an interlock passage of the body portion, wherein the interlock passage has a first end opening to the valve shaft and a second end opening to the interface end of the coupling half, wherein a first end blocking member of the plurality of blocking members is positioned at the first end of the interlock passage and contacts a cam surface of the valve shaft and a second end ball of the plurality of blocking members is positioned at the second end of the interlock passage;
    wherein, when the valve is in the closed position, the cam surface permits the plurality of blocking members to be retracted within the interlock passage such that the second end blocking member is sufficiently retracted from the interface end of the coupling half to permit the coupling half to be rotated and disengaged from the mating coupling half and, when the valve is in the open position, the cam surface positions the plurality of blocking members within the interlock passage such that a portion of the second end blocking member is positioned within the interface end of the coupling half a sufficient distance to contact the mating coupling half and prevent rotation of the coupling half relative to the mating coupling half, wherein the second end blocking member is shaped such that the plurality of blocking members are retracted within the interlock passage as a result of contact with a portion of the mating coupling half during rotation of the coupling half relative to the mating coupling half without the assistance of a biasing force applied to the plurality of blocking members.

2. The coupling half assembly of claim 1, wherein the valve shaft comprises a first portion on a first side of the valve body and a separate second portion on a second side of the valve body, wherein the handle is coupled to the first portion of the valve shaft and wherein the cam surface is defined by the first portion of the valve shaft.

3. The coupling half assembly of claim 2, wherein the handle comprises a locking mechanism having an interference member that contacts an interference contact surface of the body portion to inhibit undesired rotational movement of the handle from the open position and the closed position, wherein the handle is movable in an unlocking direction to move the interference member out of contact with the interference contact surface such that rotational movement of the handle is permitted.

4. The coupling half assembly of claim 3, wherein the unlocking direction is aligned with a longitudinal axis of the handle.

5. The coupling half assembly of claim 3, wherein the valve is a ball valve and the valve body comprises a generally spherical outer surface and a valve passage that is aligned with the internal passage of the body portion in the open position of the valve.

6. The coupling half assembly of claim 5, wherein the interlock passage is substantially aligned with an axis of the internal passage of the body portion.

7. The coupling half assembly of claim 6, wherein the plurality of blocking members comprises at least one intermediate blocking member between the first end blocking member and the second end blocking member.

8. The coupling half assembly of claim 7, wherein the at least one intermediate blocking member includes only one intermediate blocking member.

9. The coupling half assembly of claim 7, wherein the interface end of the coupling half comprises a unisex interface structure.

10. The coupling half assembly of claim 9, wherein the interface structure comprises first and second latching lugs configured to engage a groove of the mating coupling half.

11. The coupling half assembly of claim 10, wherein the first and second latching lugs have different circumferential lengths.

12. The coupling half assembly of claim 11, wherein the first and second latching lugs are separate members from the body portion and are secured to the body portion with a fastener.

13. The coupling half assembly of claim 12, further comprising an adapter secured to the body portion and configured to swivel with respect to the body portion, the adapter configured to connect to a hydraulic hose.

14. The coupling half assembly of claim 1, further comprising an adapter secured to the body portion and configured to swivel with respect to the body portion, the adapter configured to connect to a hydraulic hose.

15. The coupling half assembly of claim 1, wherein the plurality of blocking members comprises at least one intermediate blocking member between the first end blocking member and the second end blocking member.

16. The coupling half assembly of claim 15, wherein the at least one intermediate blocking member includes only one intermediate blocking member.

* * * * *